(12) United States Patent  (10) Patent No.: US 8,371,615 B2
Wilkinson  (45) Date of Patent: Feb. 12, 2013

(54) BUSINESS FORM AND METHOD OF MAKING

(75) Inventor: Patrick Fitzgerald Wilkinson, Beavercreek, OH (US)

(73) Assignee: The Standard Register Company, Dayton, OH (US)

( * ) Notice: Subject to any disclaimer, the term of this patent is extended or adjusted under 35 U.S.C. 154(b) by 233 days.

(21) Appl. No.: 12/761,648

(22) Filed: Apr. 16, 2010

(65) Prior Publication Data

US 2011/0254259 A1  Oct. 20, 2011

(51) Int. Cl.
  *B42D 1/00* (2006.01)
  *B42D 19/00* (2006.01)
(52) U.S. Cl. ............... 283/94; 281/2; 281/5; 283/81; 283/98; 283/100; 283/101; 283/105; 283/108
(58) Field of Classification Search ............. 281/2, 5, 281/10; 283/81, 94, 98, 100, 101, 105, 108
  See application file for complete search history.

(56) References Cited

U.S. PATENT DOCUMENTS

| 5,601,682 | A | 2/1997 | Longtin |
| 5,700,537 | A | 12/1997 | Instance |
| 6,053,535 | A | 4/2000 | Washburn et al. |
| 6,149,204 | A | 11/2000 | Casper |
| 6,254,138 | B1 * | 7/2001 | Rawlings et al. ............... 283/81 |
| 6,254,952 | B1 | 7/2001 | Fox et al. |
| 6,358,587 | B1 | 3/2002 | Saint et al. |
| 6,409,871 | B1 | 6/2002 | Washburn et al. |
| 6,471,817 | B1 | 10/2002 | Emmert |
| 6,755,442 | B2 | 6/2004 | Franko, Sr. et al. |
| 6,869,654 | B2 | 3/2005 | Ginkel et al. |
| 2006/0157970 | A1 | 7/2006 | Warmus |

OTHER PUBLICATIONS

Standard Register Discussion Document for ITI "Product/Production Alternatives for State DMV Products", Mar. 23, 2007.

* cited by examiner

*Primary Examiner* — Dana Ross
*Assistant Examiner* — Justin V Lewis
(74) *Attorney, Agent, or Firm* — Dinsmore & Shohl LLP

(57) ABSTRACT

A business form includes a paper carrier sheet having an upper surface and a lower surface, a barrier layer on an area of the upper surface of the paper carrier sheet, a silicone coating extending over the barrier layer, and a label assembly. The label assembly includes a label ply and a pressure sensitive adhesive coating. The label assembly is secured to the silicone coating and to the upper surface of the carrier sheet by the pressure sensitive adhesive. The label ply has a die cut through it that defines a label portion and a lip portion. The label portion is secured only to the silicone coating, and the lip portion is secured to both the silicone coating and to the upper surface of the carrier sheet. When the business form is printed with a printer, such as a laser printer, the form moves through the printer in an orientation in which the lip portion leads the label assembly. This results in the label portion being less likely to be removed from the carrier sheet inadvertently.

20 Claims, 4 Drawing Sheets

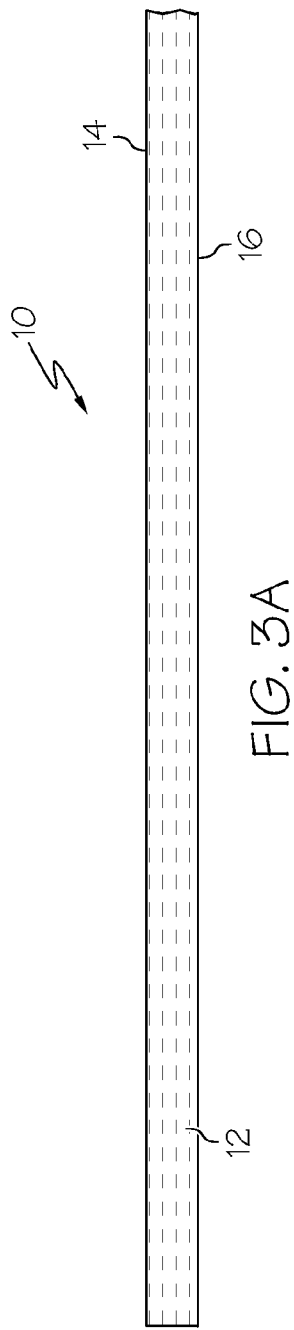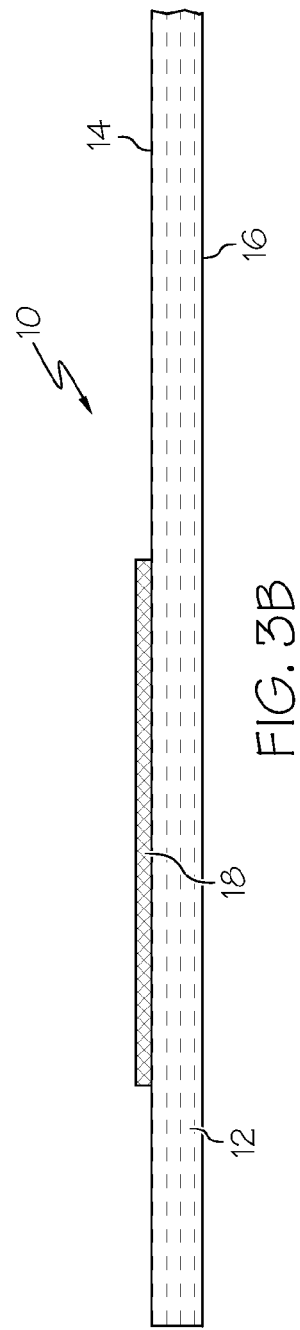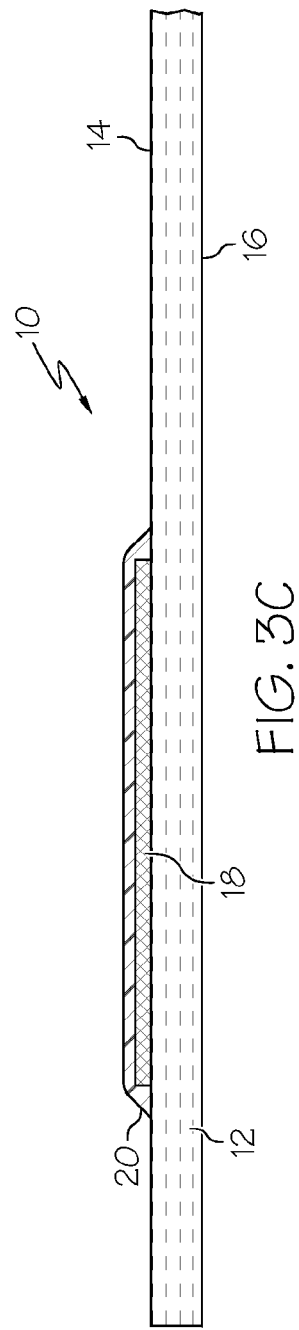

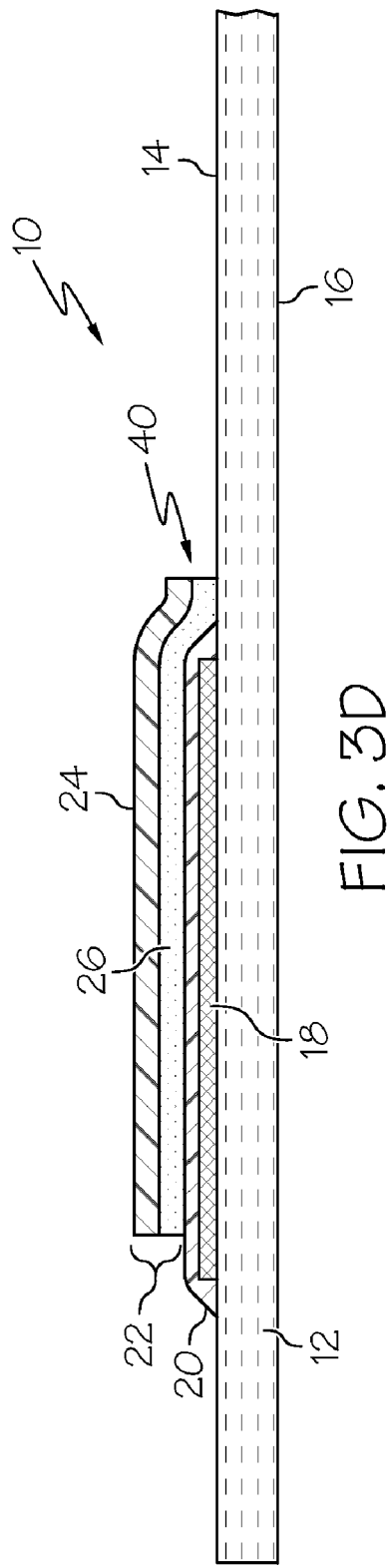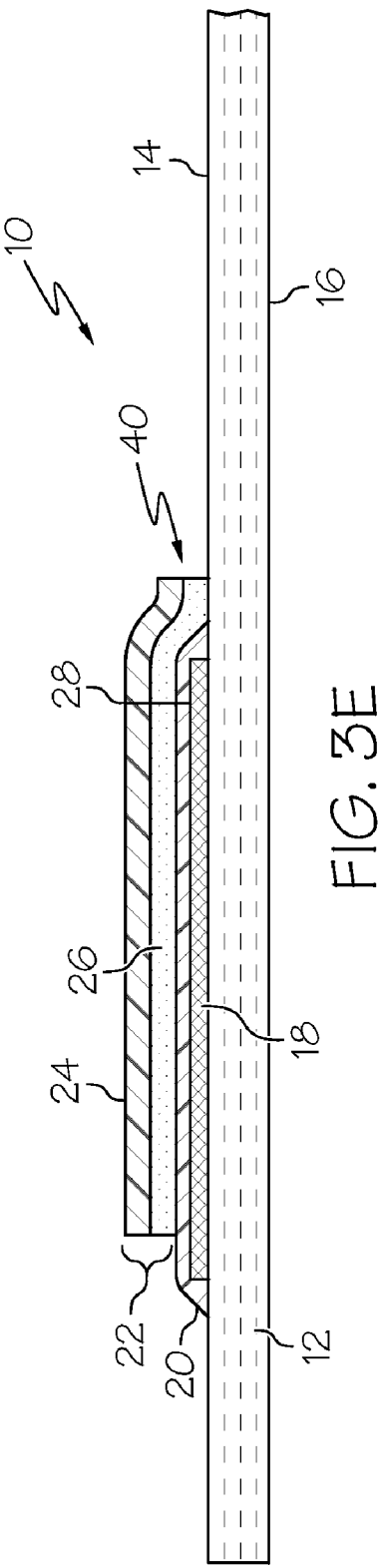

BUSINESS FORM AND METHOD OF MAKING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This relates to a document of the type which carries a label and, more particularly, to a business form having a pressure sensitive adhesive backed label mounted on a silicone coated spot on a carrier sheet. The label and the carrier sheet may be printed at the same time during a single printing pass through a laser printer or a similar printer.

Business forms of this type have a variety of uses. Such forms may, for example, be used by a state division of motor vehicles for annual license renewals. Typically, a license bureau will have a supply of these forms, each preprinted with fixed, repetitive information on the label and carrier sheet. This preprinted information may include, for example, the name of the state, graphics, and the year and month of expiration. Other fixed information may also be preprinted on the carrier sheet. Typically, such repetitive information is printed using a conventional printing process, such as flexography, gravure, letterpress, lithography, or screen printing.

When a license renewal is purchased by a vehicle owner at the license bureau, additional variable information, unique to the vehicle and vehicle owner, is printed on the label or on the carrier sheet of a form or on both. This unique, variable information may be printed with an impact printer, such as a dot matrix printer, or with a non-impact printer, such as a laser printer, a thermal transfer printer, or an ink jet printer. The vehicle owner subsequently removes the label from the carrier and applies it to the vehicle license plate. The owner may also retain the carrier sheet, or a portion of the carrier sheet, which is printed as the vehicle registration.

A difficulty can arise when printing the unique, variable information at the license bureau printer. The printer used may subject the business form to heating and bending as the form passes through the printer. Additionally, commonly the printer will move the business form through the printing path by gripping it between rotating nip wheels. This mechanical engagement of the form, in combination with bending and heating, may cause the leading edge of the label to separate from the silicone coated spot on the carrier sheet, exposing the pressure sensitive adhesive. At a nip point between nip wheels, the label may release partly or completely from the silicone coated spot on the carrier sheet, causing the label to be deposited in the printer or to adhere to another form or surface after exiting the printer.

It is seen that there is a need for a business form of this type in which the likelihood of the label becoming inadvertently detached from the carrier sheet during printing is reduced, and for a method of manufacturing such a business form.

SUMMARY

These needs are met by a business form including a paper carrier sheet having an upper surface and a lower surface, a barrier layer on an area of the upper surface of the paper carrier sheet, a silicone coating extending over the barrier layer, and a label assembly. The label assembly includes a label ply and a pressure sensitive adhesive coating. The label assembly is secured to the silicone coating and to the upper surface of the carrier sheet by the pressure sensitive adhesive. The label ply has a cut that defines a label portion and a lip portion. The label portion is secured only to the silicone coating, and the lip portion is secured to both the silicone coating and to the upper surface of the carrier sheet.

The label ply may define a straight die cut, separating the lip portion from the label portion. The label ply may comprise a ply of printable material whereby the label ply may be printed with a laser printer. The straight die cut may be adjacent the edge of the area on the upper surface of the paper carrier sheet having a barrier layer thereon. The barrier layer may be arranged in a rectangular area on the upper surface of the paper carrier sheet. The silicone coating may cover the barrier layer and extend beyond the barrier layer on the paper carrier sheet. The silicone coating is arranged in a rectangular area. The label assembly may extend beyond the silicone coating along one edge, and may be secured to the upper surface of the carrier sheet by the pressure sensitive adhesive. The label assembly may be releasably held to the silicone coating and permanently secured to the paper carrier sheet.

The business form may comprise a carrier sheet having an upper surface and a lower surface, a release coating on a portion of the upper surface of the carrier sheet, and a label assembly. The label assembly has a label ply and a pressure sensitive adhesive coating. The label assembly is secured to the release coating and to the upper surface of the carrier sheet by the pressure sensitive adhesive. The label ply has a cut therethrough which defines a label portion and a lip portion. The label portion is secured only to the release coating, while the lip portion is secured to both the release coating and the upper surface of the carrier sheet. The release coating may comprise a barrier layer on the carrier sheet, and a silicone coating extending over the barrier layer.

A method of making the business form having a paper carrier sheet and a label secured thereto, may include the steps of providing a paper carrier sheet having an upper surface and a lower surface; coating an area of the upper surface of the paper carrier sheet with a barrier layer; applying a coating of silicone material over the barrier layer; curing the silicone material; providing a label assembly having a label ply and a pressure sensitive adhesive coating; securing the label assembly to the silicone coating and to the upper surface of the carrier sheet by the pressure sensitive adhesive; and cutting the label ply to define a label portion and a lip portion, with the cut arranged such that the label portion is secured only to the silicone coating and the lip portion is secured to both the silicone coating and the upper surface of the carrier sheet.

The step of cutting the label ply to define a label portion and a lip portion may comprise the step of die cutting the label ply. The step of die cutting the label ply may comprise the step of die cutting the label ply along a straight line adjacent the edge of the coating of silicone material. The method may include the additional step of printing the label by feeding the business form through a laser printer with the direction of movement of the business form being such that the lip portion is the closest part of the label assembly to the leading edge of the business form.

It is an object to provide a business form of the type that carries a pressure sensitive adhesive backed label in which inadvertent detachment of the label is reduced, and to provide a method of making such a business form.

BRIEF DESCRIPTION OF THE DRAWINGS

FIGS. 3A-3E are partial sectional views, similar to FIG. 2, useful in explaining the method by which the business form of FIGS. 1 and 2 is made.

DETAILED DESCRIPTION OF AN EMBODIMENT

Figure 1:
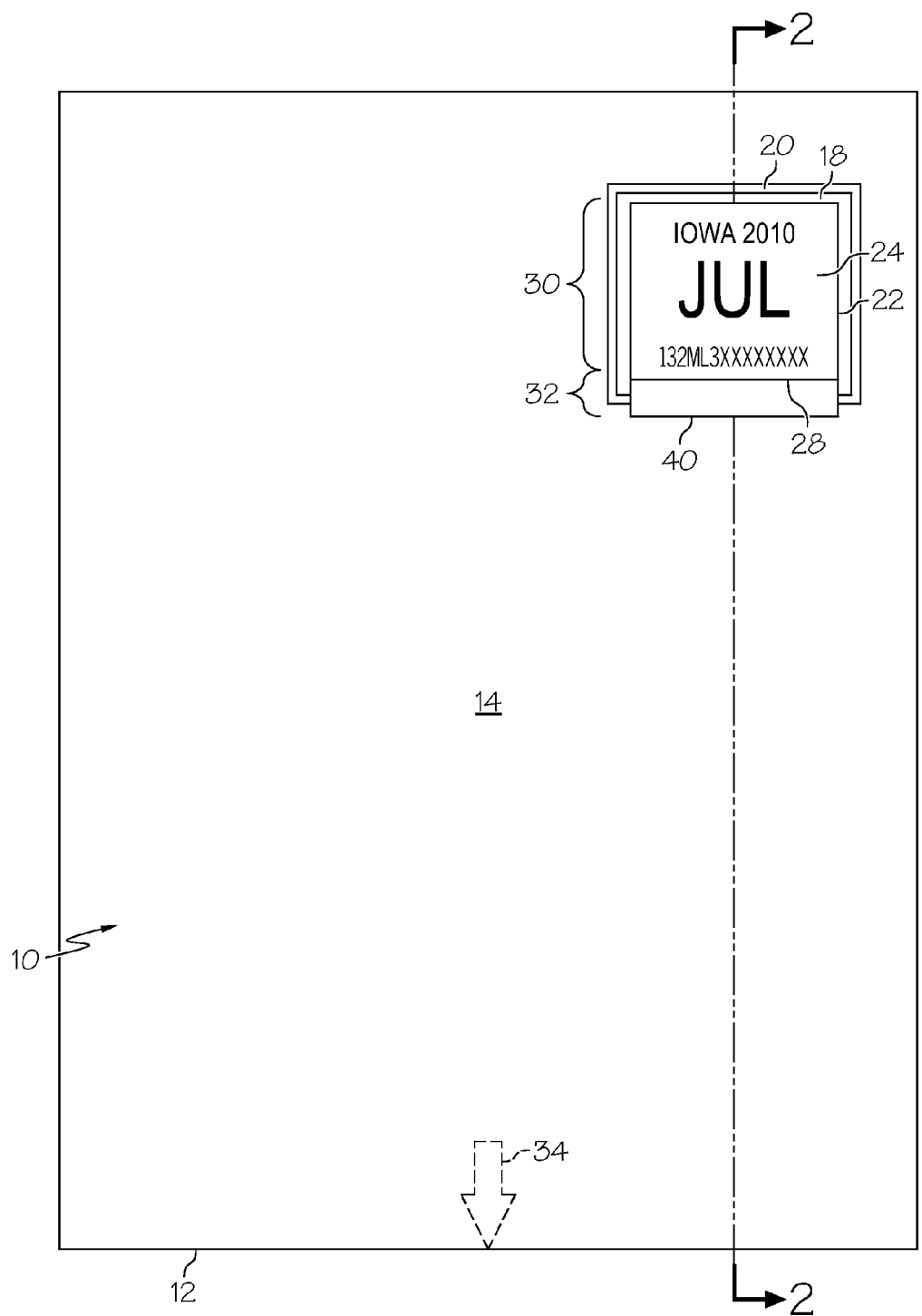
FIG. 1 is a plan view of an embodiment of the business form.
Figure 2:
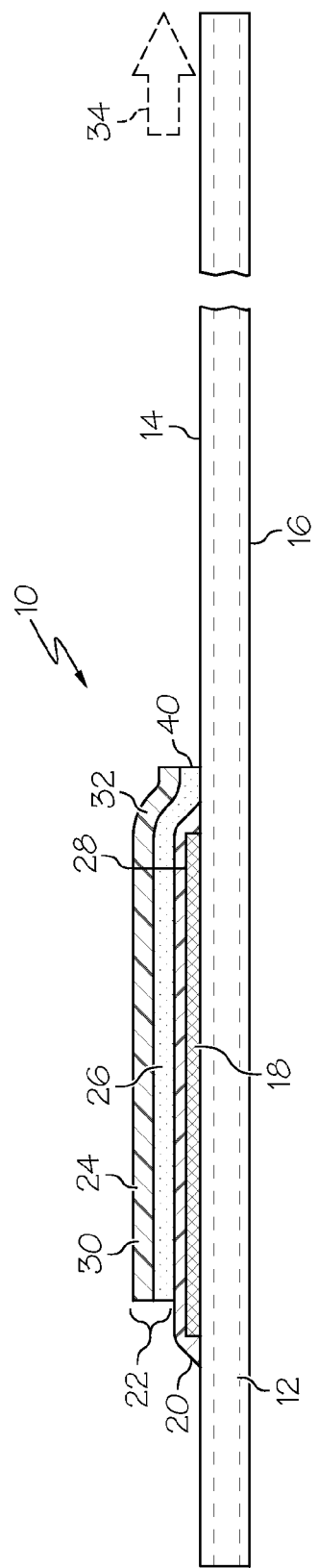
FIG. 2 is a sectional view of the business form of FIG. 1, taken along line 2-2 in FIG. 1.

Reference is made to FIGS. 1 and 2 which show an embodiment of the business form 10 to which this is directed. It will be appreciated that none of the figures are drawn to scale, and that various plies and layers are exaggerated in thickness for purposes of clarity. The business form 10 includes a paper carrier sheet 12 having an upper surface 14 and a lower surface 16. A barrier layer 18 is provided on an area of the upper surface of the paper carrier sheet. The barrier layer may for example be any of a number of known ink compositions. A coating of silicone material 20 is applied such that it extends over the barrier layer 18. The barrier layer 18 permits the silicone layer 20 to cure, unaffected by the basic pH of the paper carrier sheet 12. As is apparent from FIG. 1, the barrier layer 18 is arranged in a generally rectangular area on the upper surface 14 of the paper carrier sheet 12. The silicone coating 20 covers the barrier layer 18 and extends slightly beyond the barrier 18 layer on the paper carrier sheet 12. The silicone coating 20 is also arranged in a rectangular area.

Finally, a label assembly 22, comprising a label ply 24 and a pressure sensitive adhesive coating 26, is secured to the silicone coating 20 and to the upper surface 14 of the carrier sheet 12 by the pressure sensitive adhesive 26. The label ply 22 has a straight cut 28 therethrough which defines a label portion 30 of the label assembly 22 and a lip portion 32 of the label assembly 22. It will be noted that the label portion 30 is secured only to the silicone coating 20, while the lip portion 32 is secured to both the silicone coating 20 and the upper surface 14 of the carrier sheet 12. The cut 28 is shown as passing through both the label ply 24 and the adhesive layer 26. It will be appreciated, however, that the adhesive layer 26 may tend to join together after the cut is made, typically as a die cut. The label assembly 22 extends beyond the silicone coating 20 along one edge, and is secured to the upper surface 14 of the carrier sheet 12 by the pressure sensitive adhesive 26.

As explained more fully, below, since the lip portion 32 engages the paper carrier sheet 12 directly, it is securely attached and remains on the carrier sheet when the label portion 30 is removed and applied to a license plate. The label assembly 22 is releasably held to the silicone coating 20 and permanently secured to the paper carrier sheet 12. The lip portion 32 is oriented so that it is on the side of the label assembly 22 that leads as the business form 10 moves through a printer. This is indicated by arrow 34.

Although the business form 10 is shown as including a layer of silicone coating 20 over a barrier layer 18, it will be appreciated that other release layer materials may be utilized to spot coat the area beneath most of the label assembly and that such materials may not require a barrier layer. The straight die cut 28 is adjacent the edge 40 of the area on the upper surface 14 of the paper carrier sheet 12 having the barrier layer 18 thereon.

FIGS. 3A through 3E illustrate the method by which the business form 10 is made. A paper carrier sheet 12 having an upper surface 14 and a lower surface 16 is provided, as shown in FIG. 3A. An area of the upper surface 14 of the paper carrier sheet 12 is coated with a barrier layer 18, as shown in FIG. 3B. A coating 20 of silicone material is then applied over the barrier layer 18, as shown in FIG. 3C. Next, the silicone material 20 is cured. Depending on the silicone material used, curing may be accomplished though exposure to heat, to ultraviolet light, through a chemical reaction to a catalyst, or through some combination of these. A label assembly 22, having a label ply 24 and a pressure sensitive adhesive coating 26, is provided and secured to the silicone coating 20 and to the upper surface 14 of the carrier sheet 12 by the pressure sensitive adhesive 26, as shown in FIG. 3D. Note that edge 40 of the label assembly extends beyond the silicone layer 20 so that the adhesive 26 is in contact with carrier sheet 12. Finally, the label ply 24 is cut at 28 to define a label portion 30 and a lip portion 32, with the cut 28 arranged such that the label portion 30 is secured only to the silicone coating 20 and the lip portion 32 is secured to both the silicone coating 20 and the upper surface 14 of the carrier sheet 12 by adhesive 26.

The step of cutting the label ply 24 to define a label portion 30 and a lip portion 32 may comprise the step of die cutting the label ply 24. More specifically, this step may comprise the step of die cutting the label ply 24 along a straight line adjacent the edge 40. It will be appreciated that the label 30 may be printed along with the carrier sheet 12 by feeding the business form 10 through a printer, such as a laser printer, with the direction of movement of the business form 10 being such that lip portion 32 is the closest part of the label assembly 22 to the leading edge of the business form 10. This is illustrated with arrow 34. Because of the lip portion 32 is firmly secured to the surface 14 of the carrier sheet 12 and is the leading portion of the label assembly 22, the label assembly resists inadvertent peeling from the carrier sheet 12 as the form moves through the printer.

It will be appreciated that variations in both the structure of the business form, and the manner of its manufacture, are contemplated.

What is claimed is:

1. A business form, comprising:
    a paper carrier sheet having an upper surface and a lower surface,
    a barrier layer on an area of said upper surface of said paper carrier sheet,
    a silicone coating extending completely over said barrier layer, and
    a label assembly comprising a label ply and a pressure sensitive adhesive coating, said label assembly secured solely to said silicone coating and to said upper surface of said carrier sheet by said pressure sensitive adhesive, said label ply having a cut therethrough to define a label portion and a lip portion, said label portion being secured only to said silicone coating and said lip portion being secured to both said silicone coating and said upper surface of said carrier sheet.

2. The business form of claim 1, in which said label ply defines a straight die cut therethrough, separating said lip portion from said label portion.

3. The business form of claim 2, in which said label ply comprises a ply of printable material whereby said label ply may be printed with a laser printer.

4. The business form of claim 2, in which said straight die cut is adjacent the edge of said area on said upper surface of said paper carrier sheet having a barrier layer thereon.

5. The business form of claim 2, in which said barrier layer is arranged in a rectangular area on said upper surface of said paper carrier sheet.

6. The business form of claim 5, in which said silicone coating covers said barrier layer and extends beyond said barrier layer on said paper carrier sheet, said silicone coating being arranged in a rectangular area.

7. The business form of claim 6, in which said label assembly extends beyond said silicone coating only along one edge, and is secured to said upper surface of said carrier sheet by said pressure sensitive adhesive.

8. The business form of claim 6, in which said label assembly is releasably held to said silicone coating and permanently secured to said paper carrier sheet.

9. A business form, comprising:
   a carrier sheet having an upper surface and a lower surface,
   a release coating on a portion of said upper surface of said carrier sheet, and
   a label assembly comprising a label ply and a pressure sensitive adhesive coating, said label assembly secured to said release coating and to said upper surface of said carrier sheet by said pressure sensitive adhesive, said label ply having a cut therethrough to define a label portion and a lip portion, said label portion being secured only to said release coating and said lip portion being secured only to both said release coating and said upper surface of said carrier sheet.

10. The business form of claim 9, in which said release coating comprises a barrier layer on said carrier sheet, and a silicone coating extending completely over said barrier layer.

11. A method of making a business form having a paper carrier sheet and a label secured thereto, comprising the steps of:
   providing a paper carrier sheet having an upper surface and a lower surface,
   coating an area of said upper surface of said paper carrier sheet with a barrier layer,
   applying a coating of silicone material over said barrier layer to cover said barrier layer completely,
   curing said silicone material,
   providing a label assembly having a label ply and a pressure sensitive adhesive coating,
   securing said label assembly only to said silicone coating and to said upper surface of said carrier sheet by said pressure sensitive adhesive, and
   cutting said label ply to define a label portion and a lip portion, with the cut arranged such that said label portion is secured only to said silicone coating and said lip portion is secured only to both said silicone coating and said upper surface of said carrier sheet.

12. The method of making a business form having a paper carrier sheet and a label secured thereto according to claim 11, in which the step of cutting said label ply to define a label portion and a lip portion comprises the step of die cutting said label ply.

13. The method of making a business form having a paper carrier sheet and a label secured thereto according to claim 12, in which the step of die cutting said label ply comprises the step of die cutting said label ply along a straight line adjacent the edge of said coating of silicone material.

14. The method of making a business form having a paper carrier sheet and a label secured thereto according to claim 11, further comprising the step of printing said label by feeding said business form through a laser printer with the direction of movement of said business form being such that lip portion is the closest part of said label assembly to the leading edge of the business form.

15. The method of making a business form having a paper carrier sheet and a label secured thereto according to claim 11, further comprising the step of printing said upper surface of said paper carrier sheet and printing said label by feeding said business form through a laser printer with the direction of movement of said business form being such that lip portion is the closest part of said label assembly to the leading edge of the business form.

16. A method of making a business form having a carrier sheet and a label secured thereto, comprising the steps of:
   providing a carrier sheet having an upper surface and a lower surface,
   coating a portion of said upper surface of said carrier sheet with a release coating
   providing a label assembly having a label ply and a pressure sensitive adhesive coating,
   securing said label assembly to said release coating and to said upper surface of said carrier sheet by said pressure sensitive adhesive, and
   cutting said label ply to define a label portion and a lip portion, with the cut arranged such that said label portion is secured only to said release coating and said lip portion is secured solely to both said release coating and said upper surface of said carrier sheet.

17. The method of making a business form having a carrier sheet and a label secured thereto according to claim 16, in which the step of cutting said label ply to define a label portion and a lip portion comprises the step of die cutting said label ply.

18. The method of making a business form having a carrier sheet and a label secured thereto according to claim 16, in which the step of die cutting said label ply comprises the step of die cutting said label ply along a straight line adjacent the edge of said release coating.

19. The method of making a business form having a carrier sheet and a label secured thereto according to claim 16, further comprising the step of printing said label by feeding said business form through a laser printer with the direction of movement of said business form being such that lip portion is the closest part of said label assembly to the leading edge of the business form.

20. The method of making a business form having a carrier sheet and a label secured thereto according to claim 16, further comprising the step of printing said upper surface of said carrier sheet and printing said label by feeding said business form through a laser printer with the direction of movement of said business form being such that lip portion is the closest part of said label assembly to the leading edge of the business form.

\* \* \* \* \*